United States Patent

[11] 3,575,641

| [72] | Inventors | Harold R. Long<br>Hampton;<br>Martin J. Menges, Seaford; Samuel W.<br>Mugler, Hampton, Va. |
|---|---|---|
| [21] | Appl. No. | 796,691 |
| [22] | Filed | Feb. 5, 1969 |
| [45] | Patented | Apr. 20, 1971 |
| [73] | Assignee | The United States of America as represented by the Administrator of the National Aeronautics and Space Administration |

[54] PRECIPITATION DETECTOR
2 Claims, 2 Drawing Figs.

[52] U.S. Cl. .................................................. 317/153,
317/DIG3, 340/235
[51] Int. Cl. .................................................. H01h 47/36
[50] Field of Search .......................................... 317/153,
123 (PL); 340/235

[56] References Cited
UNITED STATES PATENTS
2,904,995  9/1959  Obermaier .................. 340/235UX

*Primary Examiner*—Lee T. Hix
*Attorneys*—Howard J. Osborn and G. T. McCoy

ABSTRACT: A precipitation detector and mechanism used to shut down a load during precipitation and activate a load upon completion of precipitation. The detector has thermistors in a bridge circuit. One of the thermistors is exposed to the elements and cooled upon being contacted with precipitation. This causes an imbalance in the bridge circuit the output of which actuates a relay that shuts down the load. Termination of precipitation allows the thermistor to warm up balancing the bridge circuit and the relay closes activating the load.

PATENTED APR 20 1971  3,575,641

INVENTORS
HAROLD R. LONG
MARTIN J. MENGES
BY  SAMUEL W. MUGLER

ATTORNEYS

000
PRECIPITATION DETECTOR

Origin of Invention

The invention described herein was made by employees of the U.S. Government and may be manufactured and used by or for the Government for governmental purposes without the payment of any royalties thereon or therefor.

This invention relates to a precipitation detector, and more particularly to a mechanism which will energize or deenergize a load depending on precipitation.

It is sometimes necessary to expose various materials to the atmospheric elements. One such arrangement is where test specimens of, for example, aircraft skin structure is fatigue tested over a period of many months. Although it is sometimes desirable to test the specimens under all atmospheric conditions, it is also often desirable to test certain of the specimens only during periods when there is no precipitation. In the past, the technique for energizing or deenergizing a machine for cyclically loading the test specimens under selected weather conditions was a manual switch. Since it is impossible to always predict when there will be precipitation, it was necessary to maintain workmen around the clock to enable closing down the machine should it start raining, and to again activate the machine when it stopped raining. Therefore, it can be seen that it would be highly desirable to have a detector which is operative upon the falling of precipitation, to deenergize the loading machine, and after precipitation has ceased, energize the machine to continue the fatigue testing. The present invention provides a detector which will automatically accomplish energization and deenergization of the loading machine depending on atmospheric conditions.

It is, therefore, an object of this invention to provide a detector which is operative to shut down a load upon falling of precipitation, and operative upon the cessation of precipitation to activate a load.

A further object of the invention is to provide the utilization of heat-sensing elements in a bridge circuit to operate a relay system to energize and deenergize a load depending on atmospheric conditions.

Another object of the invention is to provide a precipitation detector which is extremely simple in design, has a minimum number of moving parts, is highly reliable, and is designed to be exposed to the atmospheric elements over long periods of time rendering trouble-free operation.

These and other objects and advantages of the invention will become more apparent upon reading the specification in conjunction with the accompanying drawings.

Figure 1:
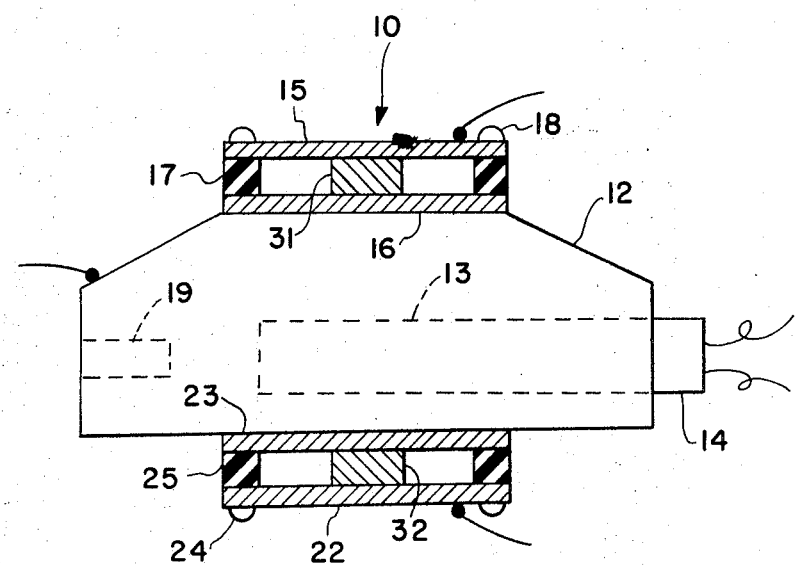
FIG. 1 is a side elevational view of the precipitation detector.

Referring now more specifically to the details of the invention, FIG. 1 illustrates the precipitation detector, designated generally by the reference numeral 10. The detector 10 has a body 12 which is made of some good heat-conducting material such as aluminum. It is not required that the body 12 have any particular shape; however, the top surface of the body is of a frustoconical shape providing a surface which will shed precipitation, and also a flattened area to position the thermo elements to be explained more fully hereinafter. An aperture or hole 13 is drilled or otherwise formed in the side of the body 12, and is adapted to receive a heater element 14. The heater element 14 may be of any conventional design, and is shown as an electrical heating element. A mounting slot 19 is formed in another side of the body and provides means whereby the detector may be attached to the framework of a loading machine or some other device.

Mounted on top of the detector body 12 is mechanism which makes up one of the elements of the bridge circuit to be explained more fully hereinafter. This mechanism includes an upper outside plate 15 and upper inside plate 16. These plates are separated by insulation material 17 and are joined to the body 12 by fasteners 18. Sandwiched between the plates 15 and 16 is the temperature-sensitive element 31. As can be seen in FIG. 1, the temperature-sensitive element is also centered with respect to the plates 15 and 16 and the body 12. The upper outside plate 15 is exposed, and will be directly subjected to atmospheric conditions such as rain or snow. The plates 15 and 16 should be made of some type of heat-conductive material, and also of a material which will withstand corrosion. The particular material chosen for the device constructed was brass, however, it should be understood that other suitable materials might be utilized.

A similar mechanism is mounted on the bottom surface of the body 12 directly opposite the previously described mechanism. This also includes a lower outside plate 22, a lower inside plate 23 and fasteners 24 which connect the plates to the body. The plates are separated by an insulating ring 25, the insulating material being positioned about the periphery of the mechanism. Sandwiched between the plates and located centrally therebetween is another temperature sensitive device in the form of a thermistor 32. The thermistor 32 is another element in the bridge circuit now to be described.

Figure 2:
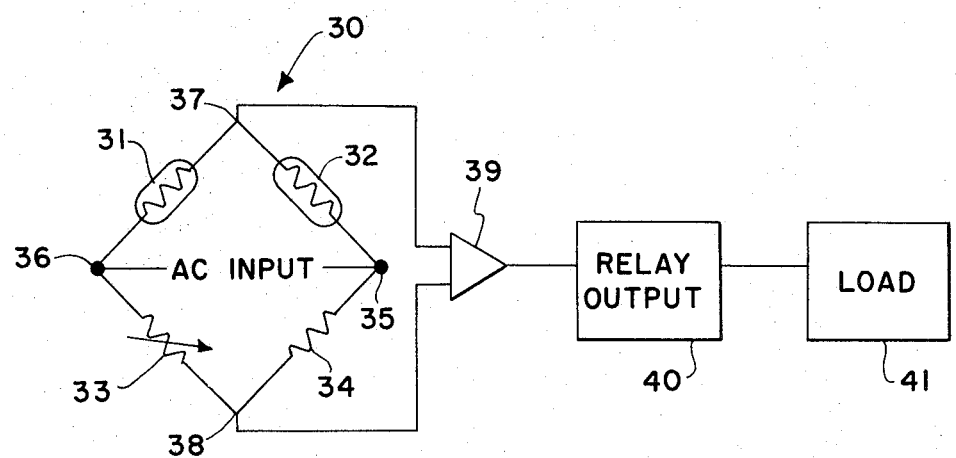
FIG. 2 is a schematic of the precipitation detector bridge circuit shown in conjunction with the relay and load.

The bridge circuit is designated generally by the reference numeral 30 and is shown schematically in FIG. 2. The thermistors 31 and 32 are positioned in opposing legs of the circuit, and a variable resistor 33 and a fixed resistor 34 are positioned in the other legs of the bridge circuit. These elements are electrically wired in the form of the conventional bridge circuit. The bridge circuit is powered in a conventional manner with an AC input connected to the points 35 and 36 in the circuit. The output from the circuit is taken from points 37 and 38, and electrically connected to a combined power supply and amplifier 39. The amplifier is wired to a normally closed relay of 40 which controls the operation of a load 41. The load 41 may be any type of device the operation of which it is desired to control.

OPERATION

Having set forth the structure of the invention, the operation of the device should now become apparent. The detector 10 is mounted on a load, the operation of which is to be dependent on the absence of precipitation. The detector 10 may be mounted with the aid of the mounting slot 19, and is positioned such that the upper plate 15 is exposed to precipitation. The heater element 14 is energized and the detector body 12 heated to a temperature of somewhat greater than the ambient temperature. The heat from the body 12 is conducted through the plates 16 and 23 to the thermistors 31 and 32. The bridge circuit may be balanced by use of the variable resistor 33 such that there is no output at the points 37 and 38. As long as there is no precipitation, the temperature of the thermistors 31 and 32 will remain the same, enabling the circuit to remain balanced. However, if precipitation falls and strikes the plate 15, the plate 15 will be cooled thereby dissipating heat from the thermistor 41 causing it to cool. This will result in an unbalance in the bridge circuit resulting in an output at the points 37 and 38 which is conveyed to the amplifier 39. The amplifier 39 strengthens the signal which operates the relay 40 opening a circuit to the load shutting it off. As long as precipitation continues, the thermistor 31 will remain cool keeping the bridge circuit out of balance, maintaining operation of the amplifier, and the relay open. Thus, as long as the precipitation falls, the load is shut down. When precipitation stops, the thermistor 31 will again warm up to the temperature of the thermistor 32 resulting in the circuit again being balanced. There is then no output from the circuit, and the normally closed relay will close again activating the load.

The sensitivity of the detector can be varied in any conventional manner such as by increasing or decreasing the resistance to the AC input, or increasing or decreasing the resistance in the bridge circuit itself. Under certain tests conditions, it may be desirable to shut down the load only when there is heavy rain or snow. On the other hand, it may be desirable to shut down the load when there is a heavy dew, the sensitivity adjustment enables this flexibility. If it is desired to have the detector extremely sensitive, it may be desirable to house the mechanism on the lower surface of the detector to maintain a more constant temperature of the thermistor 32 and to protect it entirely from the atmospheric elements. The sensitivity of the detector may also be affected by the temperature to which the body 12 is heated by the heating element 14, and in turn the heat to which the thermistors are heated. If the thermistors are maintained at a temperature which is little higher than ambient, the precipitation probably will not have as quick an effect on the detector as if the temperatures of the thermistors are maintained at several degrees above ambient. Although the invention has been described as one wherein the load is shut down when there is rain or some other form of precipitation, it should be understood that the device would work equally well to energize a load when there is precipitation and shut it down when there is no precipitation. This could be accomplished very simply by merely changing the relay to a normally open relay, and having it close upon precipitation thereby activating the load.

From the above description of the invention, it can be seen that a detector is provided which will effectively control the operation of a load dependent upon precipitation or the lack of it. Such control is automatic, eliminating the necessity of constant attention to equipment by a workman. The device has few parts requiring little maintenance, thus assuring long and reliable operation.

We claim:

1. A precipitation detector and mechanism actuator comprising: bridge circuit means; first thermistor means connected in said bridge circuit exposed to precipitation and being located between a first pair of heat-conductive plates; a heat-conductive body; at least one of said first heat-conductive plates being secured to the upper surface of said body; a second thermistor means connected in said bridge circuit means and being protected from precipitation being located between a second pair of heat-conductive plates; at least one of said heat-conductive plates being secured to the lower surface of said heat-conductive body, means for heating said heat-conductive body and plates, and thereby heating said thermistors to a temperature above ambient temperature; and relay means operable by unbalance of said bridge circuit means due to precipitation cooling said first thermistor means whereby operation of a device is terminated during precipitation.

2. A precipitation detector and mechanism actuator as in claim 1 wherein said pairs of first and second heat-conductive plates are substantially larger than said first and second thermistors; and insulation means positioned between said pairs of first and second heat-conductive plates and surrounding said thermistors.